United States Patent [19]

Nakayama et al.

[11] Patent Number: 4,831,398
[45] Date of Patent: May 16, 1989

[54] PHOTOGRAPHIC FILM PACKAGE AND METHOD OF MAKING THE SAME

[75] Inventors: Keiji Nakayama; Seimei Ushiro; Hiroshi Ohmura, all of Tokyo, Japan

[73] Assignee: Fuji Photo Film Co., Ltd., Kanagawa, Japan

[21] Appl. No.: 93,945

[22] Filed: Sep. 8, 1987

[30] Foreign Application Priority Data

Aug. 19, 1987 [JP] Japan ............................. 62-126189[U]

[51] Int. Cl.<sup>4</sup> ........................ G03B 1/04; G03B 17/02
[52] U.S. Cl. ..................................... 354/212; 354/202
[58] Field of Search ................................ 354/202, 212

[56] References Cited

U.S. PATENT DOCUMENTS

| | | | |
|---|---|---|---|
| 2,933,027 | 4/1960 | Hollingworth et al. | 354/212 |
| 3,260,183 | 7/1966 | Winkler et al. | 354/212 |
| 3,412,662 | 11/1968 | Balalis | 354/202 |
| 3,631,782 | 1/1972 | Eagle | 354/212 |
| 3,731,586 | 5/1973 | Meazza | 354/76 |
| 3,910,692 | 10/1975 | Scibilia | 354/275 X |
| 4,344,685 | 8/1982 | Milatz et al. | 354/173 |
| 4,609,271 | 9/1986 | Watanabe | 354/202 |

FOREIGN PATENT DOCUMENTS

| | | |
|---|---|---|
| 0095148 | 11/1983 | European Pat. Off. . |
| 1991324 | 3/1968 | Fed. Rep. of Germany . |
| 8131086 | 2/1982 | Fed. Rep. of Germany . |
| 47-36242 | 12/1972 | Japan . |
| 445907 | 4/1936 | United Kingdom . |
| 448127 | 6/1936 | United Kingdom . |
| 607242 | 8/1948 | United Kingdom . |
| 684704 | 12/1952 | United Kingdom . |
| 1462353 | 1/1977 | United Kingdom . |
| 2093200 | 8/1982 | United Kingdom . |
| 2138580 | 10/1984 | United Kingdom . |

Primary Examiner—Michael L. Gellner
Attorney, Agent, or Firm—Young & Thompson

[57] ABSTRACT

A lens-fitted photographic film package having exposure structure includes a light-tight securely closed film casing provided with a taking lens, a film container containing an unexposed film, a removable light-tight film container having a spool to which a leading end of the film is attached, and a film-advancing member externally operable for rotating the film spool to wind the film around the spool in the light-tight film container one frame every exposure.

9 Claims, 3 Drawing Sheets (A)

(B)

4,831,398

PHOTOGRAPHIC FILM PACKAGE AND METHOD OF MAKING THE SAME

BACKGROUND OF THE INVENTION

The present invention relates to a lens-fitted photographic film package and a method of making the same, in which an exposure means is incorporated.

It has heretofore been customary to take pictures by using a camera and a film which are separately sold. Quite often, however, amateur photographers do not have their camera with them. Therefore, it often happens that one who takes no camera along wants to take pictures. At such times, the conventional camera and film systems are inconvenient.

Accordingly, it is desirable to provide a lens-fitted film package provided with simple exposure means which can be sold at a low cost comparable to a conventional film and is available wherever ordinary photographic film is sold. Such a lens-fitted film package, after the exposure of all frames of the film, is forwarded to a photo shop without removing the exposing film. Photographic products that may be considered to be similar to such a lens-fitted film package having exposure means are proposed in, for example, U.S. Pat. No. 2,933,027 or Japanese Utility Model Publ. No. 39-33,924.

However, such a lens-fitted film package taught by the above-mentioned U.S. patent or by the above-mentioned Japanese utility model publication has by no means been successfully put into practical use because of the problem of handling the exposed film. If the lens-fitted film package is opened in a daylight room or in the open air in order to remove the exposed film therefrom, the exposed film is exposed to light because the exposed film is not in any light-shielding container or cartridge or the like. In order to prevent the exposed film being accidentally fogged by light, the exposed film is required to be removed from the lens-fitted film package in a darkroom or by use of a special protective device. Due to this problem, the exposed film in the lens-fitted film package cannot be handled for development in the same manner as conventional films in a photo shop or a photo laboratory.

OBJECT OF THE INVENTION

It is therefore an object of the present invention to provide a lens-fitted film package and a method of making the same, which is improved as to ease of handling the exposed film.

SUMMARY OF THE INVENTION

According to the present invention, a lens-fitted film package comprises a light-tight film casing provided with a taking lens, a first or film-supplying container containing a film therein and built into the light-tight film casing, and a second or film-taking light-tight film container built into the light-tight film casing. In the second light-tight film container a film leader withdrawn from the first film container is attached in the as-manufactured condition.

According to a feature of the present invention, the film is withdrawn from the first film container frame by frame, one frame per exposure, and is wound in the second light-tight film container. Therefore, when the exposure of all frames of the film is completed, the exposed film is fully wound in the second light-tight film container. The second light-tight film container can then be removed from the lens-fitted film package in a daylight room, even in the open air, without accidentally exposing the exposed film to light. Due to the provision of the second light-tight film container with a film take-up spool, the exposed film removed from the lens-fitted film package can be handled in the same manner as conventional films.

According to another feature of a preferred embodiment of the present invention, the trailing end portion of the film originally contained in the first film container is removably attached to a spool in the first film container so as to be released at the end of film advance. Due to this releasable attachment of the film, the film wound in the second light-tight film container can be removed from the lens-fitted film container quite easily even in a daylight room or in the open air.

BRIEF DESCRIPTION OF THE DRAWINGS

These and other objects and features of the present invention will become apparent from the following description of a preferred embodiment thereof with reference to the accompanying drawings in which like parts are designated by the same reference numerals throughout the several views of the drawings and wherein.

DETAILED DESCRIPTION OF THE INVENTION

The photographic package according to a preferred embodiment of the present invention incorporates various elements, in particular exposure elements, similar to those of simple still picture cameras. Because such elements are well known to those skilled in the art, this description will be directed in particular to elements forming part of, or cooperating directly with, the lens-fitted film package embodying the present invention. It is to be understood that the first and/or second film container themselves may take any of the 35 mm-size film patrones well known to those skilled in the art and already commercially available.

Figure 1:
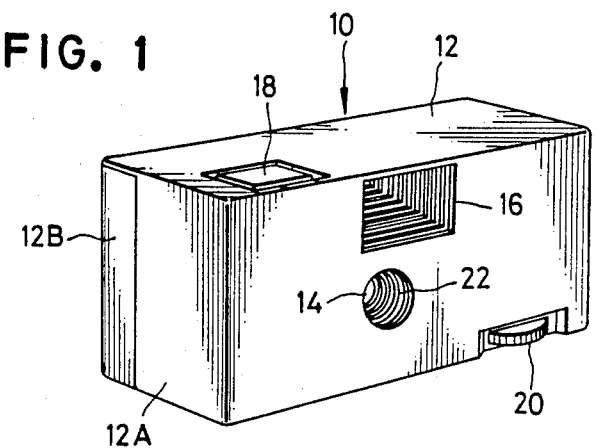
FIG. 1 is a perspective view of a lens-fitted film package of a preferred embodiment of the present invention.

Referring now to FIG. 1, shown therein is a lens-fitted photographic film package (which is hereinafter referred to as a film package for simplicity) of the present invention. The film package 10 has a rectangular box-shaped light-tight film casing 12 comprising front and rear casing sections 12A and 12B which are made of thermoplastic materials such as polystyrene-type plastic materials and which are firmly secured to each other after the installation therein of first and second film containers which will be described in detail later. This film casing 12, and particularly the front casing section 12A thereof, is provided with a taking lens 14, a tunnel-like viewfinder 16, a shutter release button 18, and a film-advancing knob 20 all of which are well known per se. Around the taking lens 14 is a frusto-conical bore 22 with circular grooves coaxially formed on the inner surface thereof for preventing diffused reflected light from entering the film casing 12 through the taking lens 14. There are also grooves formed on the inner surface of the tunnel-like finder 16 so as to prevent diffused reflected light from entering, thereby to provide an easy and clear observation of an object to be photographed.

Figure 2:
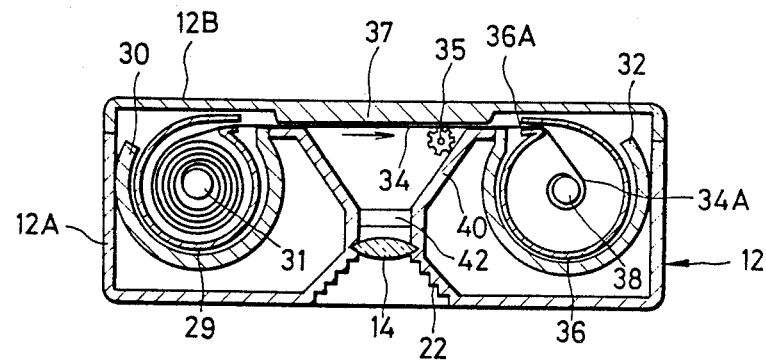
FIG. 2 is a cross sectional view of the lens-fitted film package of FIG. 1.
Figure 3:
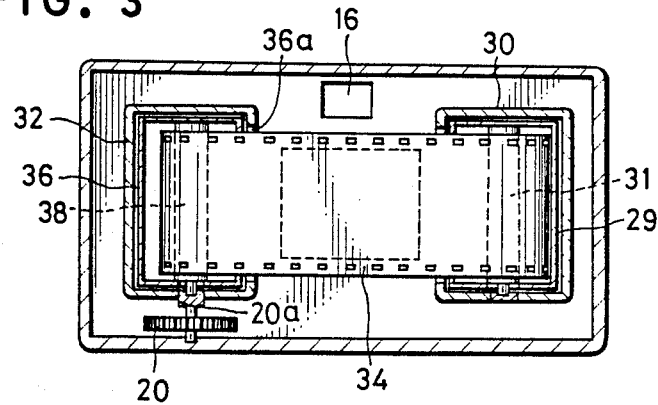
FIG. 3 is a rear view of the lens-fitted film package of FIG. 1 wherein a rear casing section is removed.

Referring to FIG. 2 showing the internal construction of the film package of FIG. 1, disposed approximately at the middle of the inside of the film casing 12 is an exposure frame 40, on one side of which, in particular on the left side as viewed in FIG. 2, a film supply chamber 30 is provided to receive a cylindrical film container 29 which is a conventional 35 mm-size film patrone and has a spool 31 wound with a roll film 34 therearound. This spool 31, as shown in FIG. 3, has a lower end projecting outside the container 29. On the other side of the exposure frame 40, a film take-up chamber 32 is provided to receive a cylindrical light-tight film container 36 which is empty. The film container 36 has a spool 38 with its lower end projecting outside the film container in the same direction as that in which the spool 31 of the film container 29 projects.

The leading end 34A of the film 34 is withdrawn from the film container 29 and attached to a spool 38 in the light-tight film container 36 in a way which will be described later. As is seen in FIG. 2, the film container 36 has a film slit 36A extending lengthwise thereof, which is directed tangentially to the circular cross sectional configuration of the cylindrical light-tight film container 36.

Denoted at 35 is a sprocket which is driven by the film 34 and cooperates with a self-cocking mechanism well known per se to those skilled in the art, to reset a shutter assembly 42 upon film advance following an exposure. If it is desirable, the sprocket may be driven by the externally operable film-advancing knob 20 so as to force the film into the light-tight film container one frame every exposure. In the exposure frame 40 and behind the taking lens 14 is the mentioned shutter assembly 42 which is simple and cheap and is not illustrated in detail because it is well known.

As is also well known in the art, the film 34 in the exposure position should be maintained photographically flat. For this purpose, the rear casing section 12B is formed with a raised portion or pressure member 35 which is adapted to press the film 34 against the exposure frame 40 from the back of the film 34 so as to maintain the film photographically flat in the focal plane of the taking lens 14. If an extremely low-cost taking lens, in particular a single lens, is used, it is often effective to make the front surface of pressure member 35 concave and the rear surface of exposure frame 40 convex to avoid the effect of field curvature of the taking lens in its focal plane.

As is shown in FIG. 3, the spool 38 of the light-tight film container 36 at its bottom is directly coupled to a fork 20a provided at the top of a shaft of the externally operable film advancing knob 20. By turning the film advancing knob 20, the film 34 is withdrawn from the film container 29 such that one frame length is advanced and wound around the spool 38 of the light-tight film container 36 every exposure. This one-frame advance of the film is effected by the mentioned self-cocking mechanism through the sprocket 35 simultaneously with the resetting of the shutter.

Figure 4:
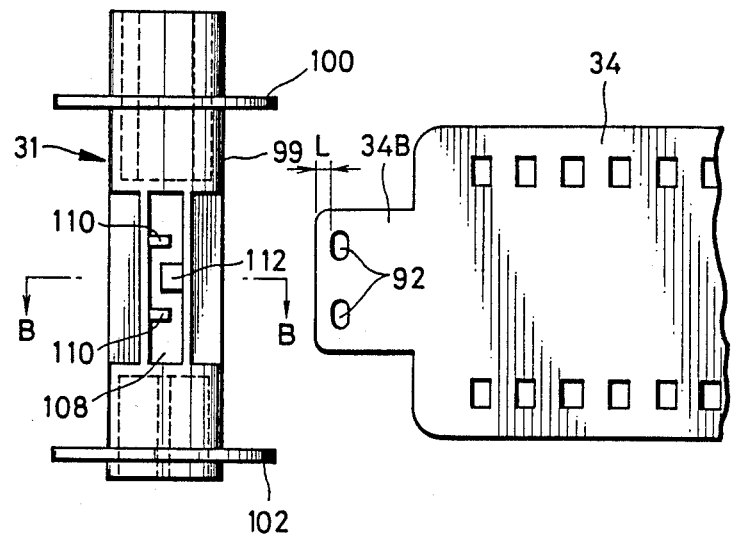
FIG. 4(A) is an exploded assembly view showing a film supply spool and an end portion of a film.
FIG. 4(B) is a cross sectional view of the film supply spool of FIG. 4(A) taken along line B—B in FIG. 4(A)
Figure 4:
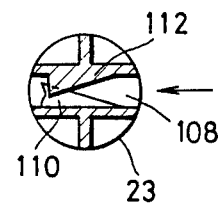
Figure 5:
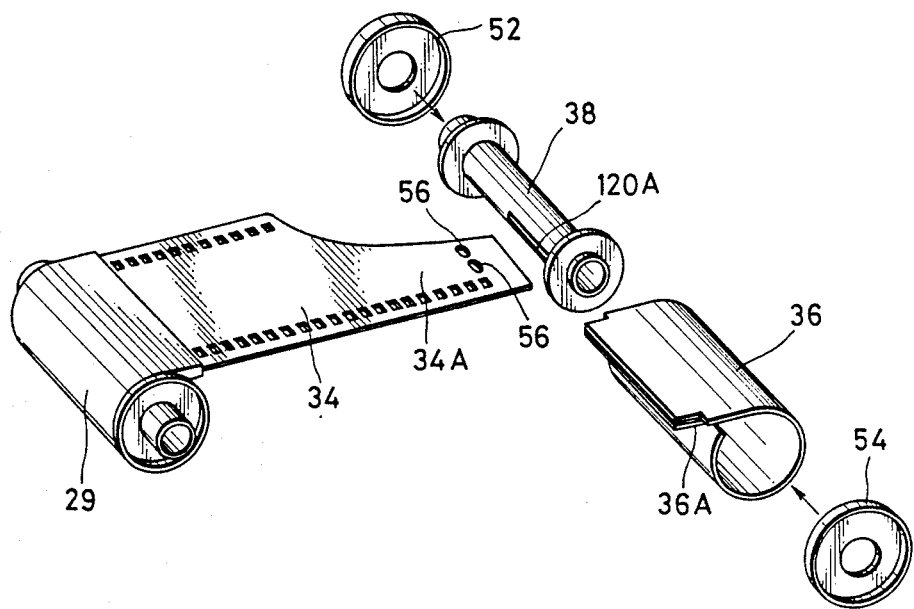
FIG. 5 is an exploded perspective view showing a film take-up container.
Figure 6:
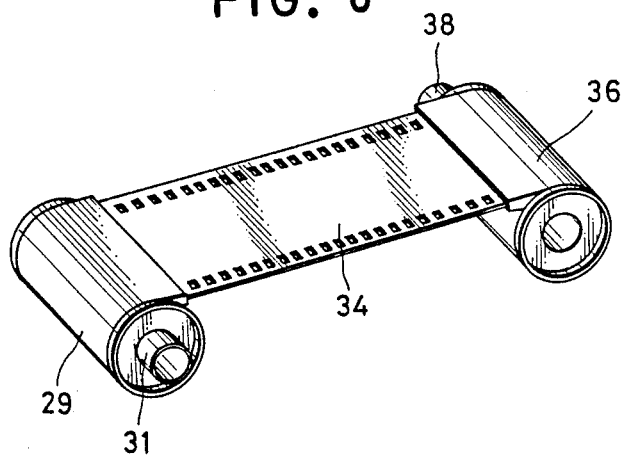
FIG. 6 is a perspective view showing a complete film assembly contained in the lens-fitted film package of FIG. 1.

Reference is now had to FIGS. 4 to 6 showing the details of a film assembly comprising the first and second film containers 29, 36 and the film 34. Preferably, the first and second film containers may be 35 mm-size film patrones as defined by International Organization Standardization (ISO) Code 1007: 1979 edition, or Japanese Industrial Standard (JIS) Code K7519: 1982 edition, both of which are commercially available.

As is shown in FIGS. 4(A) and 4(B), the spool 31 of the film container 29 has a cylindrical body portion 99 provided with flanges 100 and 102 near opposite ends thereof and formed with a slot 108 extending axially in the body portion 99. In the slot 108, a pair of hooks 110 and a retaining lug 112 are provided, the retaining lug 112 being disposed opposite to and between the pair of hooks 100 approximately at the middle of the body portion 99. On the other hand, in the end portion 34B of the film 34, there are holes 92 close to the edges of the end portion 34B. A distance L between the holes 92 and the end edge of end portion 34B is short enough to make it easy to break open the holes 92.

As is shown in FIG. 4(B), when the end portion 34B of the film 34 is inserted into the slot 108 of the spool 31 to engage the holes 92 with the hooks 110, the retaining lug 112 presses the end portion 34B of the film 34 so as to prevent the end portion 34B from slipping off the hooks 110. However, if the film 34 is pulled against the resistance of hooks 110 with even a very moderate force, the holes 92 are relatively easily broken open to allow the film 34 to be removed from the spool 31.

On the other hand, as is shown in FIG. 5, the leading portion 34A of the film 34 is also formed with holes 56. These holes 56 are located far from the forward edge of the leading portion 34A, in particular at a distance greater than the distance L with which the holes 92 are spaced from the end edge of the end portion 34B of the film. The film 34 at the leading end 34A is fixedly attached to the spool 38 of the light-tight container 36 through the holes 56. As is shown in FIG. 5, the light-tight film container 36, which, in this embodiment, takes the form of a commercially available 35 mm-size film patrone, comprises a substantially cylindrical body section having the mentioned film slit 36A extending lengthwise thereof and the spool 38 contained in the container and rotatably supported by end caps 52 and 54. The spool 38 is provided with a slot 120A in which the same film-retaining mechanism as that of the spool 31 is provided, to firmly hold the film 34. Due to the greater distance between the holes 56 and the edge of the leading portion 34A, the holes 56 will not be torn off or broken open when forcing the spool to rotate to wind up the film 34 therearound. However, it will be apparent that the leading portion 34A can be detached, or otherwise cut off from the spool 38 at a photo laboratory. It is also permissible to attach the leading portion 34A to the spool 3B by means of adhesive tape.

To make the film assembly, the leading portion 34A of the film 34 is partly withdrawn from the film container 29 and inserted into the slot 120A of the spool 38 of the light-tight film container 36, which at this time is disassembled. By the same retaining mechanism as described for the spool 31 of the film container 29, the film 34 is firmly held on spool 38 by its leading portion 34A. Then, the spool 38 is installed in the cylindrical body section while passing the leading portion 34A through the slot 36A. By fixedly attaching the end caps 52 and 54 to both ends of the cylindrical body section, the spool 38 is rotatably supported by the end caps 52 and 54 and the light-tight film container 36 is completed. In such a way, a double-container film assembly is provided as is shown in FIG. 6.

The film assembly shown in FIG. 6 is loaded in the film package 10 upon assembling the same. Specifically, with the film containers 29 and 36 spaced from each other and with the film 34 extending therebetween, the containers 29 and 36 are inserted in the film supply chamber 30 and the film take-up chamber 32 of the front casing section 12A, respectively. Then, the rear casing section 12B is placed on the back of the front casing section 12A in such a way as lightly to press the film portion extending between the film containers 29 and 36 against the exposure frame by the pressure member 37, and then firmly fixed to the front casing section 12A so as to form the complete film light-tight package. For fixing the front and rear casing sections 12A and 12B to each other, it is preferred to use ultrasonic welding, heat welding, or any other well known manner of securement.

When using the film package described above, before making the first exposure, one or more blind exposures are made to avoid fogged pictures. The shutter button 18 is depressed to actuate the shutter mechanism 42 to make an exposure. After every exposure, the film-advancing knob 20 is operated to directly turn the spool 38 in order to take up the exposed frame of the film 34 by one frame in the light-tight film container 36. This one-frame advance of the film 34, as well as shutter cocking, is automatically controlled by the self-cocking mechanism through the film-driven sprocket 35. When all frames of the film 34 are exposed and taken up in the light-tight film patrone 36, the end portion 34B of the film 34 is detached from the spool 31 of the film container 29 because the holes 92 are broken open by the tension of the film 34 advanced by the film advancing knob 20. In this way, after the exposure of all frames of the film 34, the film 34 is completely taken up in the light-tight container 36.

The film package 10 is then forwarded to a photo shop or photo laboratory to develop the film and to make prints therefrom. There, after removing the rear casing section 12B from the front casing section 12A, or otherwise breaking open the film casing 12, the light-tight film container 36 is taken out. The light-tight film container 36 can be removed in daylight, even in the open air. The light-tight film container 36 containing the exposed film 34 can be handled in a manner quite similar to, or even the same as, the 35 mm-size film patrones now commercially available so as to remove the exposed film 34. The removed exposed film is then subjected to processing for development and printing as usual.

It will be understood by those skilled in the art that the film container 29 originally containing the film 34 may not always be light-tight if the film package is assembled in a photographically dark room. However, if the case of a film container which is light-tight, the film package assembly can be completely effected in a daylight room, resulting in quite an easy assembly operation.

Although in the above-described embodiment, the film assembly is manufactured prior to assembling the film package, nevertheless the film assembly may be effected during assembly of the film package. That is, the film container 29 with the leading portion 34A withdrawn therefrom can initially be put in the film-supply chamber 30 of the front casing section 12A of the film casing 12. On the other hand, the empty light-tight film container 36 can be put in the film take-up chamber 32. Then the leading portion 34A of the film 34 can be withdrawn a little more from the film container 29 and inserted into the light-tight film container 36 through the film slit 36a to engage the holes 56 of the leading portion 34A with the retaining mechanism of the spool 38. After the completion of the engagement of the leading portion 34A of the film 34 with the spool 38, the rear casing section 12B can be welded or adhered to the front casing section 12A to complete the light-tight box-shaped film package 12.

Although the present invention has been fully described by way of preferred embodiments thereof with reference to the accompanying drawings, the possibility of making various changes and modifications will be apparent to those skilled in the art.

What is claimed is

1. A lens-fitted photographic film package having an exposure means comprising:
    a light-tight film casing provided with a taking lens and an exposure frame behind said taking lens;
    a film assembly installed in said light-tight film casing comprising first and second light-tight film containers each of which has a film-winding spool, and a film of which a trailing end is removably attached to a spool of said first film container and a leading end is fixedly attached to a spool of said second container, most of said film being wound about said spool of said first container, said first and second light-tight film containers being disposed in said light-tight film casing to place part of said film extending therebetween behind said exposure frame; and
    means coupled to said spool of said second light-tight film container for winding said film around said spool of said second light-tight film container frame by frame.

2. A lens-fitted photographic film package as defined in claim 1, wherein each of said first and second light-tight film containers is the 35 mm-size film patrone defined by ISO.

3. A lens-fitted photographic film package as defined in claim 1, wherein said light-tight film casing comprises at least two sections fixedly secured to each other.

4. A lens-fitted photographic film package as defined in claim 3, wherein each of said two sections of said light-tight film casing is made of plastic material.

5. A lens-fitted photographic film package as defined in claim 4, wherein said two sections of said light-tight film casing are fixed to each other by means of ultrasonic welding.

6. A lens-fitted photographic film package comprising:
    a light-tight film casing which is provided with a taking lens and an exposure frame behind said taking lens and which comprises at least front and rear casing sections fixedly secured to each other, one of said front and rear casing sections being partially breakable in order to form an opening;
    a first film container which has a spool with its one end projecting outside said first film container and an unexposed film wound on said spool and is disposed on one side of said exposure frame in said light-tight film casing;

a light-tight second film container having a spool with its one end projecting outside said second film container in the same direction as that in which said one end of said first film container projects, to which spool one end of said film is attached, said second film container being disposed on the other side of said exposure frame in said light-tight film casing and being removable through said opening;

film advancing means externally operable for rotating said spool of said second film container to wind said film around said spool one frame every exposure;

said film advancing means being coupled to said projecting end of said spool of said removable light-tight film container.

7. A lens-fitted photographic film package as defined in claim 6, wherein each of said first and second film containers has the form of a 35 mm-sized film patrone defined by ISO.

8. A lens-fitted photographic film package comprising:
a light-tight film casing provided with a taking lens and an exposure frame disposed behind said taking lens;
a first film container which has a spool with its one end projecting outside said first film container and an unexposed film wound on said spool disposed on one side of said exposure frame in said light-tight film casing;
a light-tight second film container having a spool with its one end projecting outside said removable light tight film container in the same direction as that in which said one end of said first film container projects, to which spool one end of said film is attached, said second film container being disposed on the other side of said exposure frame in said light-tight film casing;
film advancing means externally operable for rotating said spool of said second film container to wind said film around said spool one frame every exposure;
said film advancing means being coupled to said projecting end of said spool of said second film container.

9. A lens-fitted photographic film package as defined in claim 8, wherein each of said film containers has the form of a 35 mm-size film patrone defined by ISO.

* * * * *